United States Patent
Kespohl et al.

(10) Patent No.: US 7,519,386 B2
(45) Date of Patent: *Apr. 14, 2009

(54) MOBILE COMMUNICATION DEVICE HAVING MUSIC PLAYER NAVIGATION FUNCTION AND METHOD OF OPERATION THEREOF

(75) Inventors: Klaus Kespohl, Bochum (DE); Karsten Lehn, Kamen (DE); Andre Koll, Bochum (DE); Stefanie Vollinger, Essen (DE); Konrad Brisse, Hattingen (DE); Peter Buth, Bochum (DE)

(73) Assignee: Nokia Corporation, Espoo (FI)

( * ) Notice: Subject to any disclaimer, the term of this patent is extended or adjusted under 35 U.S.C. 154(b) by 629 days.

This patent is subject to a terminal disclaimer.

(21) Appl. No.: 10/517,019

(22) PCT Filed: Jun. 21, 2002

(86) PCT No.: PCT/IB02/02318

§ 371 (c)(1),
(2), (4) Date: Jun. 13, 2005

(87) PCT Pub. No.: WO04/001578

PCT Pub. Date: Dec. 31, 2003

(65) Prior Publication Data

US 2006/0136773 A1    Jun. 22, 2006

(51) Int. Cl.
*H04M 1/00*    (2006.01)
(52) U.S. Cl. .............. 455/550.1; 455/556.2; 455/552.1; 455/564; 345/168
(58) Field of Classification Search .............. 455/550.1, 455/567, 425, 564–565, 418–420, 552.1, 455/566, 90.1–90.3, 575.1, 556.1–556.2; 345/160, 172, 168–169; 715/773, 825, 841; 341/22; 348/14.01–14.07
See application file for complete search history.

(56) References Cited

U.S. PATENT DOCUMENTS 5,408,060 A * 4/1995 Muurinen .................... 200/314

(Continued)

FOREIGN PATENT DOCUMENTS

EP    0844778    5/1998

(Continued)

OTHER PUBLICATIONS

"Siemens SL45 User Guide"; Siemens AG, Internet article; Dec. 31, 2000; pp. 1-84.

*Primary Examiner*—Kamran Afshar
(74) *Attorney, Agent, or Firm*—Alfred A. Fressola; Ware, Fressola, Van Der Sluys & Adolphson LLP

(57) ABSTRACT

The invention relates to a controlling arrangement for a music player application in a mobile communication device. To improve the control of the music player, a multifunctional soft button (100) with four switching positions (up, down left and right) and a mode switching arrangement (110) are provided on the keyboard layout (10). The application can be switched in two different modes with the switching arrangement and can be controlled with the multifunctional soft button, the latter having different functionality depending on the mode of the application. Combined functionality of the multifunctional soft button from the first and second mode is also possible. Additional symbols related to the music player functionality are printed in different colors on the multifunctional soft switch.

17 Claims, 2 Drawing Sheets

U.S. PATENT DOCUMENTS

| | | | | |
|---|---|---|---|---|
| 5,946,376 | A * | 8/1999 | Cistulli | 379/88.06 |
| 6,052,070 | A * | 4/2000 | Kivela et al. | 341/22 |
| 6,889,043 | B2 * | 5/2005 | Okazaki et al. | 455/435.1 |
| 7,133,706 | B2 * | 11/2006 | Kespohl et al. | 455/575.1 |
| 7,356,361 | B1 * | 4/2008 | Hawkins et al. | 455/575.1 |
| 2001/0053692 | A1 * | 12/2001 | Ito et al. | 455/425 |
| 2002/0037751 | A1 * | 3/2002 | Nagase | 455/565 |
| 2002/0045438 | A1 * | 4/2002 | Tagawa et al | 455/412 |
| 2002/0161780 | A1 * | 10/2002 | Dutta et al. | 707/103 R |
| 2007/0271513 | A1 * | 11/2007 | Andren | 715/703 |

FOREIGN PATENT DOCUMENTS

| | | |
|---|---|---|
| EP | 1104150 | 5/2001 |

* cited by examiner

MOBILE COMMUNICATION DEVICE HAVING MUSIC PLAYER NAVIGATION FUNCTION AND METHOD OF OPERATION THEREOF

CROSS REFERENCE TO RELATED APPLICATIONS

This application is for entry into the U.S. national phase under §371 for International Application No. PCT/IB02/02318 having an international filing date of Jun. 21, 2002, and from which priority is claimed under all applicable sections of Title 35 of the U.S. Code including, but not limited to, Sections 120, 363 and 365(c).

TECHNICAL FIELD

The present invention relates to a mobile communication device and, in particular, to an advantageous controlling of a digital audio player implemented in the mobile communication device independent of the current operation mode of the mobile communication device by using a multiple switch operable with a mode switch having different input modes.

BACKWGROUND OF THE INVENTION

The number of applications and device functions provided by mobile phones to the users increases rapidly with each generation. The increasing number of applications and device functions result from the increasing capabilities of the hardware implemented in the mobile phones and the demand of the user. Of course, an increasing number of device applications and device functions will also result in a more complex and more sophisticated handling of the total mobile phone operation.

An appropriate design of the mobile phones is a great challenge to the mobile phone manufacturer, since partially contradictory requirements have to be fulfilled. On the one hand, the applications and device functions shall be accessed fast and in an easily understandable way. On the other hand, the number of input means, especially the number of keys, is limited in order to realize a mobile phone design of small size and low weight which is adapted to not confuse users with a high number of keys which have to be remembered for using certain device functions and applications. So an easy and preferably self explaining operability has to be ensured.

A digital music player implemented in the mobile phone is currently scheduled for advanced mobile phones of the state of the art. An easy, simple and fast control of the digital music player is important for the usability of such an improved mobile phone. Additionally the reproduction of music involves the use of headphones or the headset of the mobile phone also used for the reproduction of the speech of a telephone call. Especially, when a receiving telephone call is indicated to the user, the starting function and the stopping function of the digital music player has to be accessed fast and easily by a user.

Usually, the device applications and device functions are operable by a user with a user interface. Such a user interface presents a graphical and/or text based menu conventionally hierarchically structured to a user. The user has to navigate through the menu by selecting adapted input means, i.e. navigation keys, to track down certain menu items dedicated to a required device function or application control e.g. to trigger a certain operation. The tracking of a menu requires time and in case of a complex menu including a great number of individual items in some cases the required time is exceeding acceptable limits or will bother the user.

SUMMARY OF THE INVENTION

An object of the present invention is to provide a mobile communication device having a multiple input switch which allows a user to control the device applications and device functions in addition to the functions of a digital music player implemented in the mobile communication device as a device application of the mobile communication device. Therefore, the multiple input switch of the mobile communication device may be operated in combination with an input mode selector which allows the operation within at least two different input modes. A coloring of the printing on the multiple input switch and mode selector indicates the functionality caused by them and heightens the visual differentiation from further keys and input switches.

A further object of the present invention is to provide a method for controlling functions of a digital music player implemented in the mobile communication device. The method according to an embodiment of the invention is dedicated to a key and switch controller of the mobile communication device.

The objects of the invention are attained by a method, an apparatus and a computer program which are characterized by what is claimed in the accompanying independent claims. Further embodiments of the invention are the subject of the corresponding dependent claims.

According to an embodiment of the invention, a mobile communication device is provided. The mobile communication device comprises a plurality of device applications comprising a digital music player. The device applications represent the functions of the mobile communication device. Further, the mobile communication device has a mode selector and a multiple input switch. The mode selector is operable by a user and allows to switch an input mode into a first and into a second mode. The input mode can be an input flag having two flag states representing the first and second mode. The multiple input switch is operable by a user and allows to input a plurality of switch signals. A controller preferably embedded in the mobile communication device is connected to the mode selector and the multiple input switch. The controller receives signals from the connected key and switch and generates respective commands which are subsequently transmitted to one of the implemented device applications. The plurality of commands generated by the controller on an operation of the key and/or switch are distinguished into a first and a second set of commands. The first set of commands are operable with the input mode in the first mode and the second set of commands are operable with the input mode in the second mode. Device applications are controlled by the first set of commands corresponding to the first input mode and a selection of music player functions are controlled by the second set of commands corresponding to the second input mode.

The mobile communication device and the method according to the invention provide several advantages to the user as well as to the manufacturer of such a mobile communication device. The number of keys and switches is reduced in comparison with dedicated keys and switches. This results in an economic production of the mobile communication device due to the reduced number of keys and switches and an improved usability for the user, i.e. the assignment of the multiple switch is easily understood.

According to an embodiment of the invention, the second set of commands corresponding to the second input mode comprises a selection of control functions relating to the digital music player. The second set includes at least one of the functions that comprises a starting and a stopping function relating to the music reproduction, a skipping forward and skipping backward function relating to the skipping in-between the sequence of pieces of music being arranged in a predetermined sequence, and a fast forward and fast backward winding function relating to the fast scanning forward or backward of the actually reproduced piece of music.

According to an embodiment of the invention, the fast forward winding function of the reproduced piece of music and the fast backward winding function of the reproduced piece of music are activated by pressing and holding the multiple input switch (NK0, NK1, NK2,100) in the input mode being in the second mode for a certain (longer) period of time. The fast backward winding and the fast forward winding is active during the depressing of the multiple input switch causing one of these functions.

According to an embodiment of the invention, the skipping forward function to a subsequent piece of music and the skipping backward function to a preceding piece of music are activated by pressing and releasing the multiple input switch (NK0, NK1, NK2,100) with the input mode being in the second mode for a certain (shorter) period of time. The short period of time shall be understood as a short pressing and releasing of the multiple input switch, at least short in comparison with the above described long period of time.

According to an embodiment of the invention, the multiple input switch has at least four switching positions which allow a user to enter at least four different user inputs in combination with each of the two input modes. The at least four switching positions are distinguished between a first set of switching positions and a second set of switching positions. Each position of the each set of switching positions is arranged opposite to each other. An operation of the multiple input switch in one position of the first set and the second set of switching positions causes a command comprised in the second set of commands associated to the second input mode. An operation of the multiple input switch in one position of the first set of switching positions causes a command comprised in the first set of commands associated to the first input mode, wherein the first set of commands comprises at least a set of browsing functions to control a user interface.

According to an embodiment of the invention, switching positions of the first set of switching positions are aligned. The switching positions of the second set of switching positions are aligned. The alignment lines of the first set of switching positions and of the second set of switching positions are substantially perpendicular to each other.

According to an embodiment of the invention, a third set of commands is provided and operable with the input mode in the first mode as well as in the second mode. This third set of commands is employed to control a further selection of music player functions advantageously different from the selection of music player functions.

According to an embodiment of the invention, the multiple input switch has at least four switching positions corresponding to four user inputs. The at least four switching positions are distinguished between a first set of switching positions and a second set of switching positions. Each position of the each set of switching positions is arranged opposite to each other. An operation of the multiple input switch in one position of the first set of switching positions causes a command comprised in the first set of commands associated to the input mode being in the first mode. An operation of the multiple input switch in one position of the first set of switching positions causes a command comprised in the second set of commands associated to the input mode being in the second mode. Further, an operation of the multiple input switch in one position of the second set of switching positions causes a command comprised in the third set of commands.

According to an embodiment of the invention, switching positions of the first set of switching positions are aligned. The switching positions of the second set of switching positions are aligned. The alignment lines of the first set of switching positions and of the second set of switching positions are substantially perpendicular to each other.

According to an embodiment of the invention, the music player is adapted to reproduce a plurality of pieces of music arranged in a pre-determined sequence. The second set of commands relates to a starting function and a stopping function of the music reproduction. Advantageously, the stopping function is a halting function or an interrupting function, whereas the starting function is a resuming function, i.e. a resuming of the music reproduction at a certain reproduction position e.g. at a reproduction position defined by a previous halting function.

The third set of commands is associated with a skipping forward function and a skipping backward function. The forward function causes a skipping of the music reproduction to the beginning of the subsequent piece of music in the sequence of the plurality of pieces of music or causes a fast forward scanning of the actually reproduced piece of music. The backward function causes a skipping of the music reproduction to the beginning of the current reproduced piece of music or leads to a skipping of the music reproduction to the beginning of a preceding piece of music in the sequence of the plurality of pieces of music or causes a fast backward scanning of the actually reproduced piece of music.

According to an embodiment of the invention, the music player is adapted to reproduce a plurality of pieces of music arranged in a predetermined sequence. The second set of commands is associated with a forward function and a backward function and the third set of commands relates to a starting function and a stopping function of the music reproduction. The assignment of the music player related functions are exchanged between the second set of commands and the third set of commands and causes operation as described above.

According to an embodiment of the invention, the multiple input switch has symbol printings which represent at least the music player functions operable with the multiple input switch. The symbols and the mode selector have substantially a common color in order to indicate the combined operation of the switch and the key. Preferably, this color is different from the balance of a keyboard or keypad of the mobile communication device to increase the visible differentiation between them.

According to an embodiment of the invention, the mode selector is operable by a user. Preferably, the mode selector is depressed and held to switch from one of the two input modes to the other, advantageously from the first mode to the second, i.e. the first mode is active when the mode selector is not depressed and the second mode is active during depressing of the mode selector.

According to an embodiment of the invention, the mobile communication device comprises a user interface. The user interface offers a controlling of the device functions to a user employing it. Preferably, such a user interface is a hierarchically structured and textual based or graphical based user interface, e.g. a menu comprising menu subjects associated with certain groups of related device applications, sub-subject menus associated with applications of the group of related applications and further menu items associated with settings, preferences, single applications and the like. The first set of commands is adapted to provide navigation functions to a user through the user interface. Advantageously, the navigation functions are browsing forward and backward through the menu subjects, menu sub-subjects and menu items which are preferably arranged in a pre-determined sequence. Conveniently, the changing of hierarchical levels of the user interface is operable by further keys provided by the mobile communication device for operating by a user.

According to an embodiment of the invention, the mobile communication device comprises further a display for displaying the user interface. The controller is connected via a display driver with the display for controlling.

According to an embodiment of the invention, the user interface comprises a music player user interface for controlling the functions of the music player. This music player user interface is displayed to a user when the second input mode is active or valid, respectively. The music player user interface includes at least user interface items or sub-subjects, respectively, associated to the stating, stopping, skipping forward and skipping backward functions. The music player user interface can additionally comprise status information about the music player status, such as title of the actual piece of music, present play time, remaining play time, total number of pieces of music and the like.

According to an embodiment of the invention, the digital music player included in the mobile communication device is operable with the user interface implemented in the mobile communication device to control the applications ad functions comprised in and provided by the mobile communication device. The dedicated user interface module, i.e. a digital music player user interface contained user interface, in the, is presented to a user e.g. on selecting a certain user interface item. In case this digital music player user interface is active and displayed the the input mode is switched automatically into the second mode which intends that the multiple input switch is exclusively operable to initiate music player functions.

According to an embodiment of the invention, a method for controlling functions of a digital music player implemented in a mobile communication device is provided. The method comprises the following operations. A mode signal is received. The mode signal switches an input mode into a first mode and into a second mode. Further, an input signal is received. A command is generated. The generation of the command is based on the received input signal and based on the input mode. The generated command is one of a plurality of commands, wherein the plurality of commands is grouped into a first set of commands and a second set of commands. The first set of commands is generated in combination with the first input mode whereas the second set of commands is generated in combination with the second input mode.

In case the above generated command is one command from among the first set of commands, the generated command is transmitted to one out of the plurality of device applications. The plurality of device applications comprise the digital music player. The transmitted commands is to control one of the plurality of device applications or to control the device functions represented by the device applications implemented in the mobile communication device.

In case the above generated command is one command from among the second set of commands, the generated command is transmitted to the digital music player to control a set of music player functions. The music player functions are represented by the digital music player application implemented in the mobile communication device. Advantageously, the set of music player functions is represented by a group consisting of a starting function and stopping function or by a group consisting of a skipping forward function and skipping backward function.

According to an embodiment of the invention, the plurality of commands is grouped into a first set of commands, a second set of commands and a third set of commands. The third set of commands is generated in combination with both the first and the second input mode.

In case the above generated command is one command from among the third set of commands, the generated command is transmitted to the digital music player to control another set of music player functions. The music player functions are represented by the digital music player application implemented in the mobile communication device. Advantageously, the other set of music player functions is represented by a group consisting of a skipping forward function and skipping backward function or by a group consisting of a starting function and stopping function.

The aforementioned operations of the method according to an embodiment of the invention are preferably executed on a controller of the mobile communication device coupled to a keyboard providing the necessary input means, i.e. the mode selector and the multiple input switch.

Further, the controller is coupled to an processing unit, e.g. a central processing unit, which is responsible of the execution of the device applications and hence also of the device functions.

BRIEF DESCRIPTION OF THE DRAWINGS

The invention will be described in greater detail by the means of preferred embodiments with reference to the accompanying drawings, in which.

DETAILED DESCRIPTION

Figure 1A:
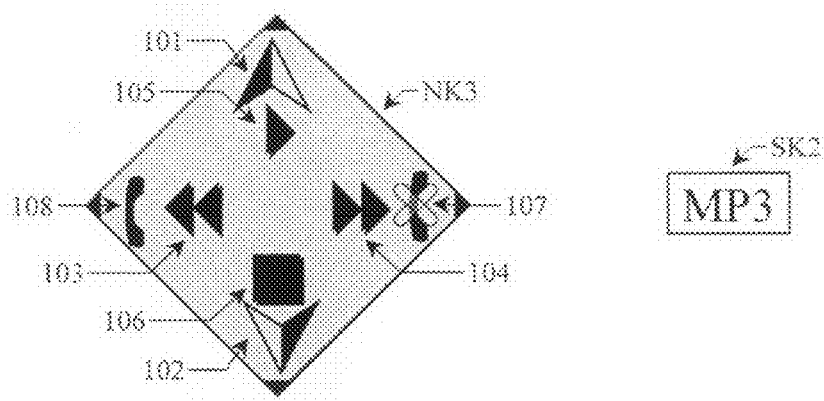
FIG. 1a shows a top view of a four-way switch having a symbol printing according to an embodiment of the invention.

The following description relates to mobile communication device and the method according to embodiments of the invention. Same or equal parts shown in the figures will be referred by the same reference numerals.

Figure 1B:
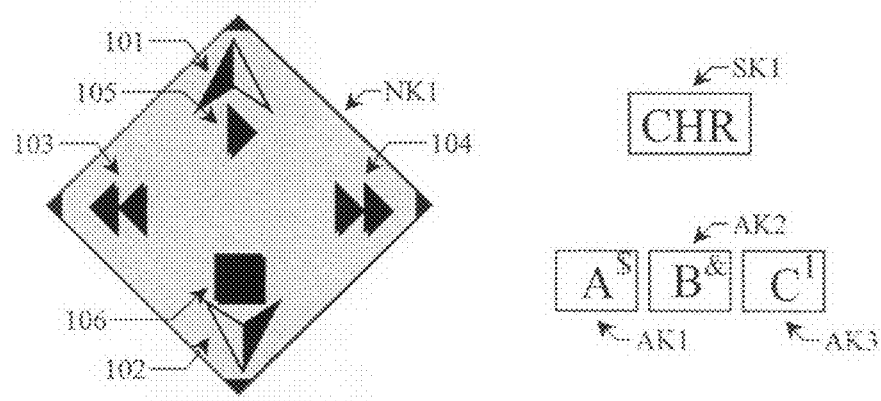
FIG. 1b shows a top view of a four-way switch having a symbol printing according to an embodiment of the invention.
Figure 1C:
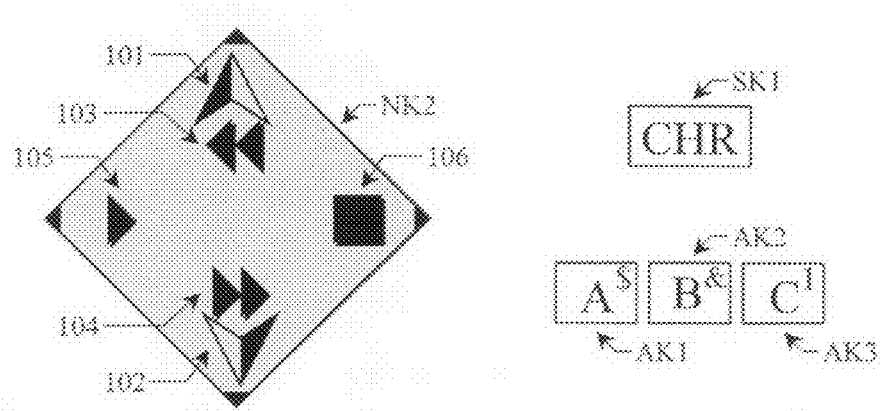
FIG. 1c shows a top view of a four-way switch having a symbol printing according to a further embodiment of the invention.

The following FIG. 1a, FIG. 1b and FIG. 1c relate to the design of the four-way switch and the arrangement of the symbols depicted on the four-way switch according to embodiments of the invention. Such four-way switches are distinguished by operating in anyone of the four positions which will be termed as "up", "down", "left" and "right" corresponding to the illustrated figurative representation of the four-way switches shown in FIG. 1a, FIG. 1b and FIG. 1c.

FIG. 1a shows a top view of a four-way switch NK0 having a symbol printing according to an embodiment of the invention. The individual symbols printed on the four-way switch NK0 relate to the functions triggered by the operation of the respective switching position.

The symbols 101 and 102, i.e. the symbol 101 depicted on the four-way switch NK0 represents an upwards arrow and the symbol 102 represents a downwards arrow, relate to the controlling of a user interface provided by the mobile phone to a user. This user interface allows the user to select and control device functions and applications of the mobile phone. Preferably, the device functions are represented by different applications, like phone application, short message service (SMS) application, calendar application, address book application and the like. Further preferably, the user interface is a textually based menu or a graphically based menu containing advantageously hierarchically arranged menu subjects, menu sub-subjects and menu items dedicated to preferences, instructions and control functions of the device functions and applications implemented in the mobile phone and to be used by the user.

The symbols 107 and 108 relate to the controlling of the telephone function of the mobile phone, i.e. the symbol 108 relates to picking up or answering function, respectively, whereas the symbol 107 relates to hanging up or ringing off function, respectively.

The symbols 103, 104, 105 and 106 relate to the controlling of a digital audio player. Preferably, the digital audio player is one of the plurality of applications implemented in the mobile phone and to be used by the user. The depicted symbols 103, 104, 105 and 106 represent conventional symbols used for labeling control keys of audio player. In FIG. 1a, the symbol 105 relates to the start operation, i.e. the starting of the reproduction of music by the digital audio player. The symbol 106 relates to the stop operation, i.e. the interruption or breaking off of music reproduction by the digital audio player. The symbols 105 and 106 are printed on the four-way switch in the "up" and "down" positions in combination with the symbols 101 and 102 for controlling the user interface of the mobile phone.

The pieces of music reproduced by the digital audio player are stored in a dedicated storage component. The individual pieces of music are arranged in a pre-defined sequence. In FIG. 1a, the symbol 103 relates to a skipping backward operation in the sequence of stored music songs, i.e. the skipping backward to the beginning of the current reproduced music song or to the beginning of the music song preceding in sequence. Correspondingly, the symbol 104 relates to a skipping forward operation in the sequence of stored music songs, i.e. the skipping forward to the beginning of the music song following in sequence. The symbols 103 and 104 are printed on the four-way switch in the "left" and "right" positions in combination with the symbols 108 and 107 for controlling telephone call functions of the mobile phone.

The designation of the four-way switch NK0 in the "up", "down", "left" and "right" position to four different operations initiated upon operating of each switching position requires a differentiation under which circumstances which operation is initiated. Therefore, the operation of the four-way switch is combined with an additional operating mode selector SK2. The mode selector SK2 and all following mode selectors are illustrated as keys. Of course the mode selector SK2 and all following mode selectors can be embodied by a multiple switch operable to cause multiple inputs, an actuator being actuatable to cause multiple inputs and further switching meeans operable by a user to enter inputs, wherein one of the multiple inputs is interpreted as a mode selecting input.

By the means of the mode selector SK2 the mobile phone having the four-way switch NK0 is switched into two different input modes, a first mode and a second mode. The first and second modes are switched by operating the mode selector SK2. The switching from the first to the second mode can a toggling between the modes each time the mode selector SK2 is operated, i.e. depressed and released. The switching from the first to the second mode can also be performed by depressing and holding the mode selector SK2 such that only during the depressing of the mode selector SK2 the second mode is active. In this case the four-way switch NK0 has to be operated during the pressing of the mode selector SK2 to initiate operations dedicated to the second mode and relating the respective operating position. That is a simultaneous operation of the mode selector SK2 and the four-way switch NK0.

In the first operating mode, the operating of four-way switch NK0 in the "up" and "down" switching positions, respectively, initiates the aforementioned controlling of the device functions and applications or the handling, i.e. controlling and selecting, of the user interface for controlling the device functions and applications, respectively. In the second operating mode, the operating of four-way switch NK0 in the "up" and "down" switching positions, respectively, initiates the aforementioned controlling of the digital music player or the start and the stop operations of the digital music player, respectively.

In the first operating mode, the operating of four-way switch NK0 in the "up" and "down" switching positions, respectively, initiates the aforementioned controlling of the telephone call functions. In the second operating mode, the operating of the four-way switch NK0 in the "left" and "right" switching positions initiates the aforementioned skipping backward and skipping forward operations of the digital music player.

FIG. 1b shows a top view of a four-way switch NK1 having a symbol printing according to an embodiment of the invention. The individual symbols printed on the four-way switch NK1 relate to the functions triggered by the operation of the respective switching position.

The symbols 101 and 102, the symbol 101 depicted on the four-way switch NK1 represents an upwards arrow and the symbol 102 represents a downwards arrow, relate to the controlling of a user interface provided by the mobile phone to a user. This user interface allows the user to select and control device functions and applications of the mobile phone. Preferably, the device functions are represented by different applications, like phone application, short message service (SMS) application, calendar application, address book application and the like. Further preferably, the user interface is a textually based menu or a graphically based menu containing advantageously hierarchically arranged menu subjects, menu sub-subjects and menu items dedicated to preferences, instructions and control functions of the device functions and applications implemented in the mobile phone and to be used by the user.

The symbols 103, 104, 105 and 106 relate to the controlling of a digital audio player. Preferably, the digital audio player is one of the plurality of applications implemented in the mobile phone and to be used by the user. The depicted symbols 103, 104, 105 and 106 represent conventional symbols used for labeling control keys of audio player. In FIG. 1b, the symbol 105 relates to the start operation, i.e. the starting of the reproduction of music by the digital audio player. The symbol 106 relates to the stop operation, i.e. the interruption or breaking off of music reproduction by the digital audio player. The symbols 105 and 106 are printed on the four-way switch in the "up" and "down" positions in combination with the symbols 101 and 102 for controlling the user interface of the mobile phone.

The pieces of music reproduced by the digital audio player are stored in a dedicated storage component. The individual pieces of music are arranged in a pre-defined sequence. In FIG. 1b, the symbol 103 relates to a skipping backward operation in the sequence of stored music songs, i.e. the skipping backward to the beginning of the current reproduced music song or to the beginning of the music song preceding in sequence. Correspondingly, the symbol 104 relates to a skipping forward operation in the sequence of stored music songs, i.e. the skipping forward to the beginning of the music song following in sequence. The symbols 103 and 104 are printed on the four-way switch in the "left" and "right" positions.

The designation of the four-way switch NK1 in the "up" and "down" position to two different operations initiated upon operating of each switching position requires a differentiation under which circumstances which operation is initiated. Therefore, the operation of the four-way switch is combined with an additional operating mode selector or a mode selector SK1, respectively. By the means of the mode selector SK1 the mobile phone having the four-way switch NK1 is switched into two different input modes, a first mode and a second mode; The first and second modes are switched by operating the mode selector SK1. The switching from the first to the second mode can a toggling between the modes each time the mode selector SK1 is operated, i.e. depressed and released. The switching from the first to the second mode can also be performed by depressing and holding the mode selector SK1 such that only during the depressing of the mode selector SK1 the second mode is active. In this case the four-way switch NK1 has to be operated during the pressing of the mode selector SK1 to initiate operations dedicated to the second mode and relating the respective operating position. That is a simultaneous operation of the mode selector SK1 and the four-way switch NK1.

In the first operating mode, the operating of four-way switch NK1 in the "up" and "down" switching positions, respectively, initiates the aforementioned controlling of the device functions and applications or the handling, i.e. controlling and selecting, of the user interface for controlling the device functions and applications, respectively. In the second operating mode, the operating of four-way switch NK1 in the "up" and "down" switching positions, respectively, initiates the aforementioned controlling of the digital music player or the start and the stop operation of the digital music player, respectively.

The operating of the four-way switch NK1 in the "left" and "right" switching positions initiates the aforementioned skipping backward and skipping forward operations independently from the operating mode, since only one dedicated operation is assigned to the operating of the four-way switch NK1 in the "left" and "right" switching positions, respectively.

The first and second mode can also be extended to the operating of further keys of the mobile phone. Exemplary, keys AK1, AK2 and AK3 are depicted in FIG. 1b and are used to input characters, here key AK1 is dedicated to character "A", key AK2 is dedicated to character "B" and key AK3 is dedicated to character "C". The depressing of these keys is interpreted correspondingly during the operation of the mobile phone in the first mode. In combination with the mode selector SK1, i.e. in the second mode, the depressing of these keys is interpreted as an input of the symbols printed additionally on the keys, here the symbol "$" on key AK1, the symbol "&" on key AK2 and the symbol "1" on key AK3.

FIG. 1c shows a top view of a four-way switch NK2 having a symbol printing according to a further embodiment of the invention. The symbols relating to the controlling of the digital music player and correspondingly the operation initiated by operating the four-way switch NK2 in a respective switching position are arranged in a different manner. The symbols 105 and 106 for initiating the start operation and stop operation, respectively, are printed on the four-way switch NK2 in the "left" and "right" switching position, respectively. The symbols 103 and 104 for initiating the skipping backward and skipping forward operation, respectively, are printed on the four-way switch NK2 in the "up" and "down" switching position, respectively.

Correspondingly in the first operating mode, the operating of four-way switch NK2 in the "up" and "down" switching positions, respectively, initiates the aforementioned controlling of the device functions and applications or the handling, i.e. controlling and selecting, of the user interface for controlling the device functions and applications, respectively. In the second operating mode, the operating of four-way switch NK2 in the "up" and "down" switching positions, respectively, initiates the aforementioned skipping backward and skipping backward operation of the digital music player, respectively.

The operating of the four-way switch NK2 in the "left" and "right" switching positions initiates the aforementioned start and stop operations independently from the operating mode, since only one dedicated operation is assigned to the operating of the four-way switch NK2 in the "left" and "right" switching positions, respectively.

The mode selector SK1 shown in FIG. 1c is operated analogously to the mode selector SK1 described in detail with reference to FIG. 1b. Further, the additional keys AK1, AK2 and AK3 are also operated analogously to the keys AK1, AK2 and AK3 described in detail with reference to FIG. 1b.

The following notice relates to the embodiments of the invention shown in FIG. 1, FIG. 1b and FIG. 1c.

Preferably, in order to allow a user to easily recognize the meaning of the four-way switch NK0, NK1 or NK2, respectively, i.e. the operation initiated by operating the four-way switch NK0, NK1 or NK2, respectively, the symbols are colored differently. The symbols 101 and 102 (in case of NK0: the symbols 101, 102, 107 and 108) dedicated to the controlling of the device functions and applications are colored differently to the symbols 103, 104, 105 and 106 dedicated to the controlling of the digital music player, i.e. the color of the symbols 103, 104, 105 and 106 heights the visible differentiation from the balance of further implemented keys.

In case of an embodiment referred to in FIG. 1a, the mode selector SK2 and at least symbols 103, 104, 105 and 106 have the same color in order to indicate that the music player functions indicated by the symbols 103, 104, 105 and 106 are initiated by selecting the four-way switch NK0 in combination with the mode selector SK2. The symbols 103, 104, 105 and 106 and the mode selector SK2 shown in FIG. 1a are colored gray.

In case of an embodiment referred to in FIG. 1b and FIG. 1c, the mode selector SK1 and at least symbols 103 and 104 of the group of symbols 103, 104, 105 and 106 have the same color in order to indicate that the play and stop operations indicated by the symbols 103 and 104 are initiated by selecting the four-way switch NK1 or NK2 in the "up" or "down" switching positions, respectively, in combination with the mode selector SK1. The symbols 103, 104, 105 and 106 and the mode selector SK1 shown in FIG. 1b and FIG. 1c are colored gray.

The above described input mode relates to an input mode of the keys, keypad or the keyboard of the mobile phone. Commonly, the mobile phone is operated in different device operating mode relating to the device functions and applications. The device operating mode can be an idle or standby mode, respectively, an application specific mode and the like. The application specific mode terms the operating mode during the operating or executing of a certain device function or application for example during the making of a call, the reading or writing of a short message and the like as well as the controlling of the digital music player. The input mode can be automatically adjusted to the current device operating mode. Preferably, while the idle mode is active the input mode is in the first input mode whereas while an application specific mode of the digital music player is active the input mode is in the second input mode. Hence, the mode selector SK1 or SK2 does not have to be operated to switch to the second input mode.

Figure 2:
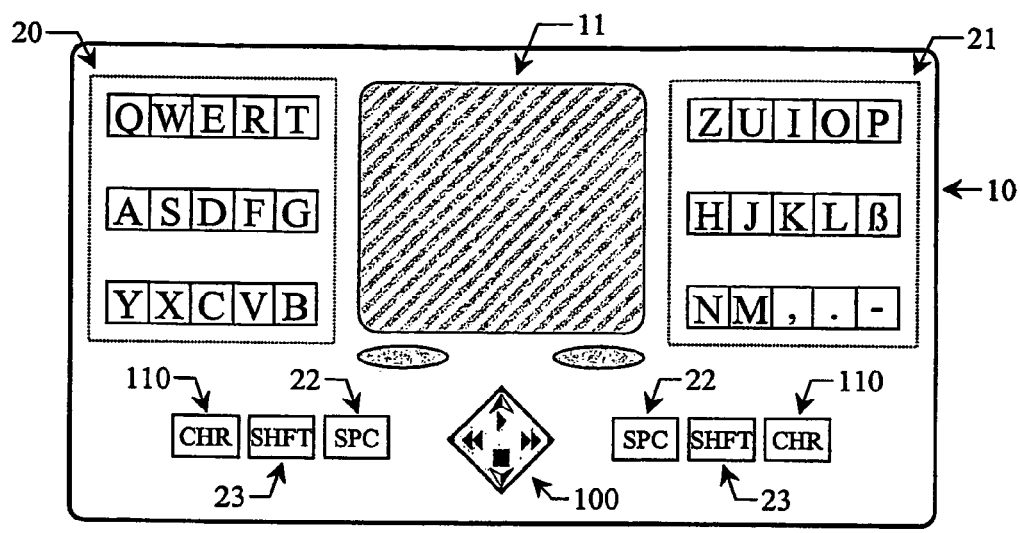
FIG. 2 shows a top view of an improved mobile communication device having a four-way navigation key according to an embodiment of the invention and FIG. 3 shows a block diagram illustrating components of a mobile communication device according to an embodiment of the invention.

FIG. 2 shows a top view of an improved mobile phone having a four-way navigation key according to an embodiment of the invention. The mobile phone 10 has a QWERTY keyboard divided into two keyboard parts 20 and 21, a display 11, additional keyboard keys 23 and 24, a shift key and a space key, a four-way switch 100 and a mode selector 110. The four-way toggle key 100 as well as the mode selector 110 are a four-way toggle key or a mode selector, respectively, of the kind described in detail with reference to FIG. 1a, FIG. 1b and FIG. 1c (four-way toggle keys NK0, NK1 or NK2, mode selectors SK2 or SK1).

Preferably, the display 11 allows to display common status information, a user interface, application specific interfaces and status information and the like to a user of the mobile phone.

The QWERTY keyboard consisting of the part 20 and the part 21 in combination with the additional keys 22 and 23 is allows a user to input alphanumeric text. Preferably, the mode selector 110 allows to switch the input function of the keys to an alternative input function, e.g. to input numeric characters, permutation marks or special symbols instead of the depicted characters. The switching of the input function is described in detail with reference to the additional keys AK1, AK2 and AK3 illustrated in FIG. 1b and FIG. 1c. Keys may have a multiple assignment which is switched by dedicated input mode selectors wherein the mode selector 110 may be one of a plurality of mode selectors used for switching into multiple input modes corresponding to the multiple assignment of the keys.

Alternatively and with reference to FIG. 1a, the switching of the input function by operating of mode selector 110 takes exclusively effect to the input mode being associated to the four-way toggle key 100. The input mode selected and switched by means of the mode selector 100 does not effect any other keys having multiple assignments.

Advantageously, the operating of the mode selector initiates the displaying of digital music player specific information on the display 11. Preferably, this displayed specific information is an application specific user interfaces to control the digital music player including information about the current status of the digital music player, e.g. title of the reproduced music song, play time etc.

It shall be noted that the four-way switch is an embodiment of the claimed multiple input switch which preferably offers the at least required four switching positions. The depicted four-way switch is a four-way navigation switch. An adequate multiple input switch can also be a joystick switch offering at least four detectable switching positions or a plurality of single switches implemented as a multiple input switch. Further switching positions of the multiple input switch may be associated with further control functions.

Figure 3:
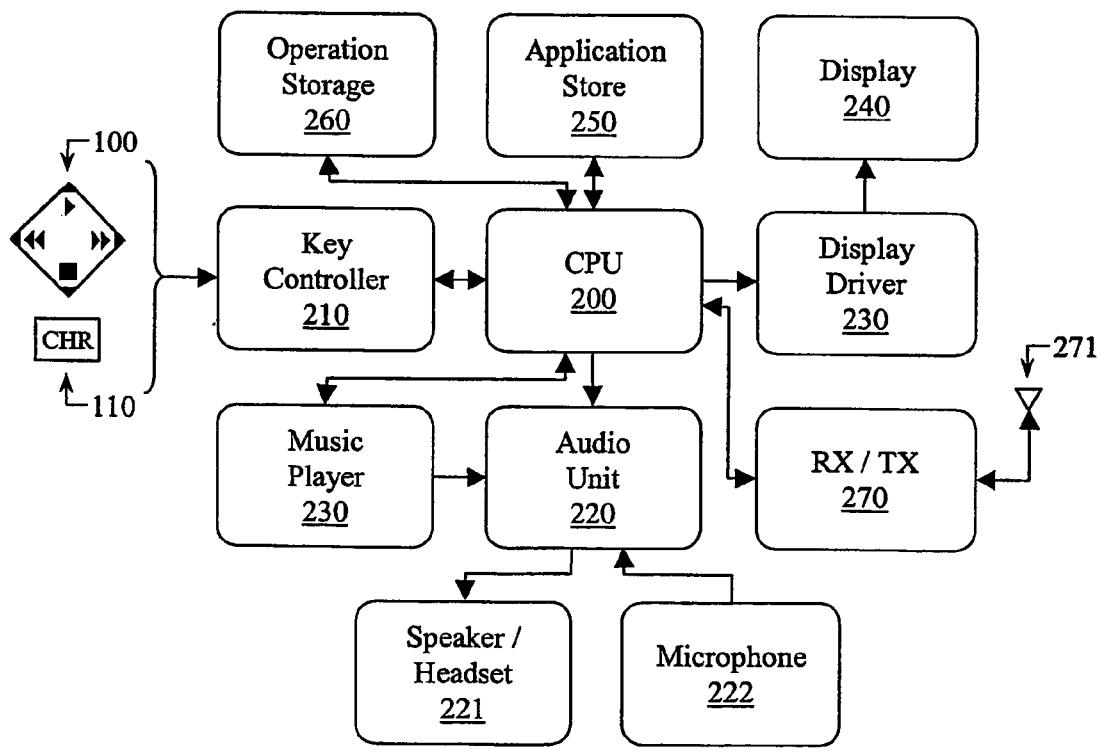

FIG. 3 shows a block diagram illustrating components of a mobile phone according to an embodiment of the invention. The depicted components include a key controller 210, a central processing unit 200, an audio unit 220 having a music player 230, a display driver 230 controlling a display 240, a transceiver unit (RX/TX) 270 connected to an antenna 271, an operation storage 260 and an application store 250.

Electrical key signals generated by operating a four-way switch 100 and a mode selector 110 are supplied to a key controller 210 which generates corresponding logical signals to be processed and handled correspondingly by the processing unit 200. Preferably, the key controller 210 is supplied with the electrical signals of all keys, e.g. the keys of the part 20 and 21 of the QWERTY keyboard and the keys 22 and 23 illustrated in FIG. 2, for generating corresponding commands representing the assigned key function to be processed and handled correspondingly by the processing unit 200.

The processing unit executes the applications of the mobile phone contained in the application store 250. Preferably, the applications of application store 250 comprises a user interface of the kind described above. More preferably, further device functions are represented and/or controlled by corresponding function controlling applications. The operation storage 260 allows to store operation relevant information. The operation relevant information comprises operating mode information e.g. information about the input mode and the device operating mode both described in detail above. The processing unit 200 is connected to the operation storage 260 to obtain and store such information and the processing unit 200 operates in accordance with the stored information and supplies the information to components of the mobile phone requiring operation relevant information for operating, e.g. the key controller described below.

The common status information, a user interface, application specific interfaces and further status information are displayed via the display drier 230 and the display 240 to the user. The display driver 230 comprises adequate means for generating graphics, text and symbols on the display.

The audio unit 220 provides the connectivity to speakers, headphones and a microphone or a headset containing headphones and microphone for reproducing an audio signal and for recording audio signal. Therefore, the audio unit 220 contains at least amplifiers, an analog digital convert (ADC) and a digital analog converter (DAC). Further, the digital music player 230 is connected to the audio unit 220 for reproducing pieces of music via the connected headphones or headset, respectively.

Preferably, the operating of the four-way switch 100 as well as the operating of the mode selector 110 generates two electrical signals, one signal initiated by the operation of the four-way switch 100 and signaling the depressed switching position from the valid group of positions comprising "up", "down", "left" or "right", respectively, and one signal initiated by the operating of the mode selector 110. The key controller receives these two signals and advantageously, generates a corresponding command dependent on the operating of the four-way switch 100 and the input mode resulting from the operation of the mode selector 110. This resulting command is assigned to either the controlling of the device functions and applications or the controlling of the user interface, respectively, and the controlling of digital music player 230. That is, the aforementioned operations dedicated to the digital music player 230 are initiated by receiving the corresponding commands generated by the key controller 210 and transmitted via the processing unit 200.

Preferably, in accordance with the method according to an embodiment of the invention, the commands are grouped among three different sets of commands. The first set of commands being operable in combination with the first input mode is associated with the controlling of the device applications and device functions or advantageously provide a possibility to navigate through the user interface of the mobile phone. The second set of commands being operable in combination with the second input mode is associated with a first set of music player functions and the third set of commands being operable in combination with the first and second input mode is associated with a second set of music player functions. The first and the second set of music player functions includes at least the functions of the group comprising the start and stop function and the skip forward and backward function.

Advantageously, the digital music player 230 comprises a dedicated music storage (not shown) for storing and retrieving pieces of music to be reproduced. Alternatively, the digital music player 230 use a storage component (not shown) of the mobile phone for storing and retrieving. Such a storage component can be a random access memory (RAM) implemented within the mobile phone or an externally connected memory module, e.g. a MultiMediaCard.

The digital music player 230, the key controller 210, the audio unit 220, the transceiver 270 and the display driver 230 may be constituted by a data processing component or a hardware circuit which may be comprised by the mobile phone. Further, the digital music player 230, the key controller 210, the display driver 230, the user interface and the applications may be constituted by a code section for executing on the mobile phone or the processing unit 200 containing instructions for carrying out the necessary processing operations. Moreover, the digital music player 230, the key controller 210, the audio unit 220, the transceiver 270 and the display driver 230 may be constituted by a portion of the mobile phone. Additionally, the digital music player 230, the key controller 210, the audio unit 220, the transceiver 270 and the display driver 230 may be constituted by a hybrid system comprising a data processing component or a hardware circuit and a code section for executing on the mobile device containing instructions for carrying out the necessary processing operations in combination with the data processing component or a hardware circuit.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matter of the structure and arrangements of parts within the principles of the present invention to the full extend indicated by the broad general meaning of the terms in which the appended claims are expressed. For example, the particular elements may vary depending on the particular application for the mobile communication device and the digital music player while maintaining substantially the same functionality without departing from the scope and the spirit of the present invention. Further, although the invention has been illustrated as implemented in circuit block, those skilled in the art will recognize that the invention may be implemented in any hardware, software or hybrid systems.

The invention claimed is

1. A mobile communication device, comprising:
 a plurality of device applications including a digital music player;
 a mode selector for switching an input mode into a first mode and into a second mode, said mode selector being operable to change modes in at least one application;
 a multiple input switch, said switch being operable to receive a user input; and
 a controller connected to said multiple input switch and to said mode selector, adapted to generate commands and adapted to transmit said commands to one of the plurality of device applications;
 wherein said commands include a first set of commands operable with said input mode being in said first mode and a second set of commands with said input mode being in said second mode; wherein said first set of commands corresponding to said first mode are adapted to control device applications, including device applications other than music player functions; and
 wherein said second set of commands corresponding to said second mode is adapted to control a set of music player functions, wherein said second mode is exclusively dedicated to said controlling of said music player functions independent from a current operation mode of said mobile communication device.

2. The mobile communication device according to claim 1, wherein a plurality of pieces of music are arranged in a predetermined sequence, wherein said second set of commands comprises commands out of a group comprising:
 a starting function of the music reproduction;
 a stopping function of the music reproduction;
 a fast forward winding function of the reproduced piece of music;
 a fast backward winding function of the reproduced piece of music;
 a skipping forward function to a subsequent piece of music; and
 a skipping backward function to a preceding piece of music.

3. The mobile communication device according to claim 2, wherein said fast forward winding function of the reproduced piece of music and said fast backward winding function of the reproduced piece of music are activated by pressing and holding said multiple input switch in said input mode being in said second mode for a certain period of time.

4. The mobile communication device according to claim 2, wherein said skipping forward function to a subsequent piece of music and said skipping backward function to a preceding of music are activated by pressing and releasing said multiple input switch in said input mode being in said second mode for a certain period of time.

5. The mobile communication device according to claim 2, wherein said mode selector is reserved for switching exclusively said input mode into said first mode and said second mode.

6. The mobile communication device according to claim 2, wherein said multiple input switch has at least four switching positions, wherein
 said at least four switching positions comprises a first set of switching positions and a second set of switching positions, said switching positions of said first set and said second set being arranged opposite to each other;
 wherein said multiple input switch operated in one position of said first and/or second set of switching positions causes a commands out of said second set of commands corresponding to said input mode being in second mode;
 wherein said multiple input switch operated in one position of said first set of switching positions causes a command out of said second set of commands comprising at least browsing functions to control a user interface and corresponding to said input mode being in said first mode.

7. The mobile communication device according claim 6, wherein said first set of switching positions is arranged along a first line and said second set of switching positions is arranged along a second line being substantially perpendicular to said first line.

8. The mobile communication device according to claim 1, wherein
  a third set of commands is provided operable with said input mode being in said first or said second mode, said third set of commands being adapted to control a subset of music player functions.

9. The mobile communication device according to claim 1, wherein at least a set of symbols printed on said multiple input switch indicates said music player functions to be controlled and wherein said set of symbols and said mode selector have substantially a common color.

10. The mobile communication device according to claim 1, wherein said second mode is active during depressing and holding said mode selector.

11. The mobile communication device according to claim 1, further comprising:
  a user interface adapted to control said device applications, wherein said first set of commands is adapted to provide a browsing function through said user interface.

12. The mobile communication device according to claim 11, further comprising:
  a display for displaying said user interface to a user, said display being coupled to said controller via a display driver.

13. The mobile communication device according to claim 12, wherein a music player control user interface is displayed to said user in said second mode.

14. The mobile communication device according to claim 12, wherein said input mode is automatically switched into said second mode in case a music player control user interface is displayed.

15. A method for controlling functions of a digital music player implemented in a mobile communication device, comprising:
  receiving a mode signal from a mode selector;
  switching an input mode into a first mode or into a second mode in accordance with said received mode signal;
  receiving an input signal from a multiple input switch;
  generating a command from said received input signal in combination with said input mode, said command being one of a plurality of commands including a first set of commands generated in said first mode and a second set of commands generated in said second mode; and
  in case said generated command is one of said first set of commands, transmitting said generated command to one of a plurality of device applications, including device applications other than said digital music players, to be controlled in accordance with said generated command; wherein
  in case said generated command is one of said second set of commands, transmitting said generated command to said digital music player to control a set of music player functions; wherein said second mode is exclusively dedicated to said controlling of said music player functions independent from a current operation mode of said mobile communication device.

16. The method according to claim 15, further comprising:
  generating a command from said received input signal in combination with said input mode, said command being one of a plurality of commands including a first set of commands generated in said first mode, a second set of commands generated in said second mode and a third set of commands generated in said first mode and said second mode; and
  in case said generated command is one of said third set of commands, transmitting said generated command to said digital music player to control another set of music player functions.

17. A mobile communication device, comprising:
  a plurality of device applications including a digital music player;
  means for switching an input mode into a first mode and into a second mode, said means being operable to change modes in at least one application;
  means for receiving a user input; and
  means, in cooperative engagement with said means for switching and said means for receiving, for generating commands and for transmitting said commands to one of the plurality of device applications including device applications other than music player functions;
  wherein said commands include a first set of commands operable with said input mode being in said first mode and a second set of commands with said input mode being in said second mode; wherein said first set of commands corresponding to said first mode are adapted to control device applications, including device applications other than music player functions; and
  wherein said second set of commands corresponding to said second mode is adapted to control a set of music player functions, wherein said second mode is exclusively dedicated to said controlling of said music player functions independent from a current operation mode of said mobile communication device.

* * * * *

UNITED STATES PATENT AND TRADEMARK OFFICE
CERTIFICATE OF CORRECTION

PATENT NO. : 7,519,386 B2  
APPLICATION NO. : 10/517019  
DATED : April 14, 2009  
INVENTOR(S) : Kespohl et al.

Page 1 of 1

It is certified that error appears in the above-identified patent and that said Letters Patent is hereby corrected as shown below:

Title page, item [57] Abstract should read
--The invention relates to a mobile communication device including a music player and a method of its operation. In order to improve the usability and to speed the controlling of the implemented music player, a advantageous keyboard layout including a multiple switch is provided. The multiple switch is dedicated to control device applications as well as the music player. Therefore, a mode selector is additionally included to switch the into different input mode allowing to input commands by the multiple switch dedicated to the device applications or the music player, respectively, corresponding to the selected input mode. Additionally, the coloring of the symbol printing on the multiple switch and the mode selector is adapted to the key assignments corresponding to the different input mode to height the visible differentiation from the balance of the keyboard and to lead a user operating the multiple switch.--.

At column 16, line 1, claim 15, line 16, please remove the word "players" and replace with the word --player--.

Signed and Sealed this

Thirtieth Day of June, 2009

JOHN DOLL  
*Acting Director of the United States Patent and Trademark Office*